3,039,553
STEERING CONTROL ARRANGEMENT FOR TRACTOR HAVING ROTATABLE SEAT
Cornelis van der Lely and Ary van der Lely, Maasland, Netherlands, assignors to C. van der Lely N.V., Maasland, Netherlands, a Dutch limited company
Filed Oct. 8, 1958, Ser. No. 766,008
Claims priority, application Netherlands Oct. 10, 1957
13 Claims. (Cl. 180—77)

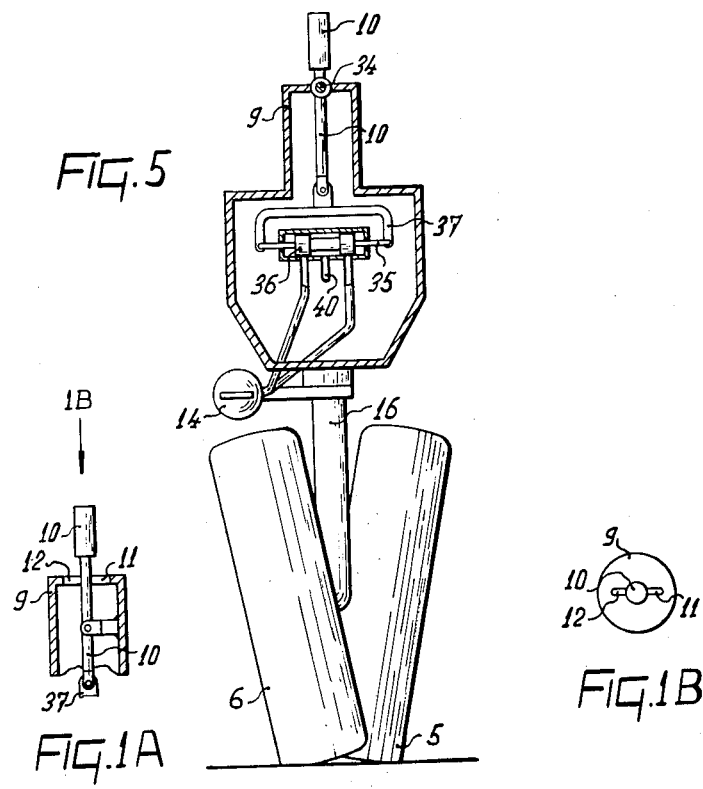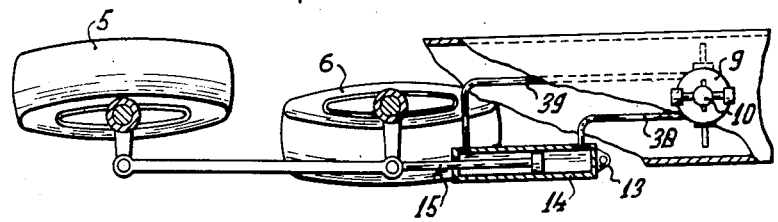

This invention relates to tractors and like devices for use with agricultural implements and of the type having at least one steerable ground wheel and several seat arrangements relative to a steering member for an operator.

It is an object of the invention to provide a tractor or the like in which the possibility for making steering errors is substantially reduced. In accordance with the invention, in a tractor of the like there is provided a unique arrangement of a lever manually movable in a direction transverse of the longitudinal extent of the tractor, movement of the lever by a driver to one of the sides of the tractor producing a corresponding steering movement of the tractor to the same side.

Figure 1:
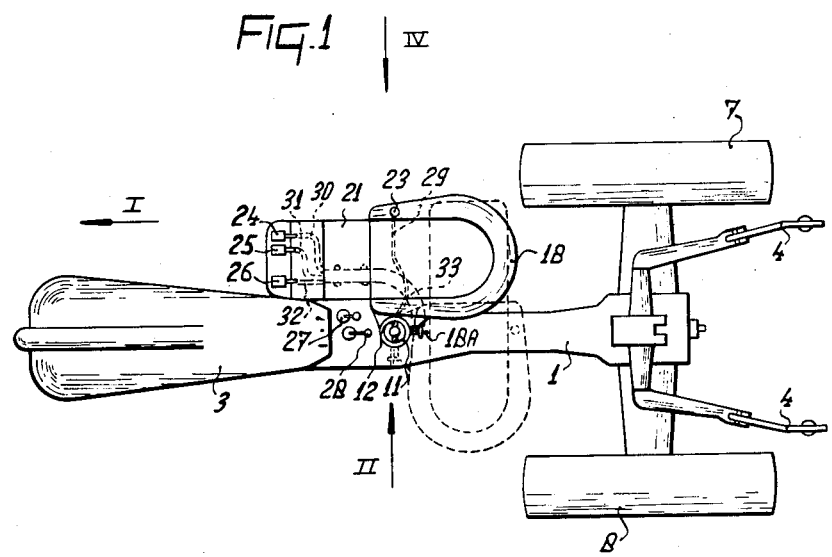
Figure 2:
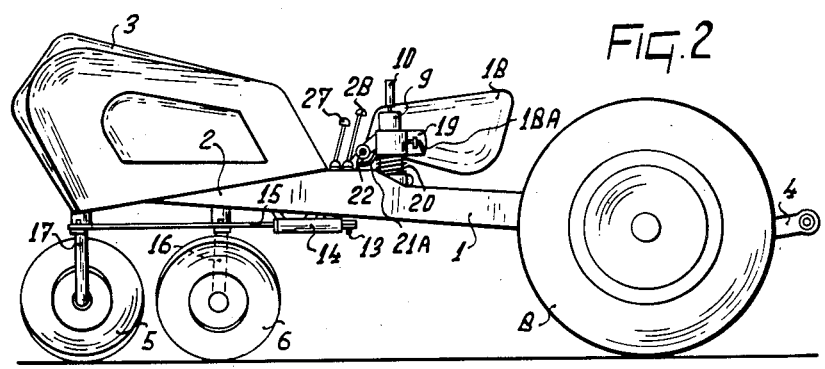
Figure 3:
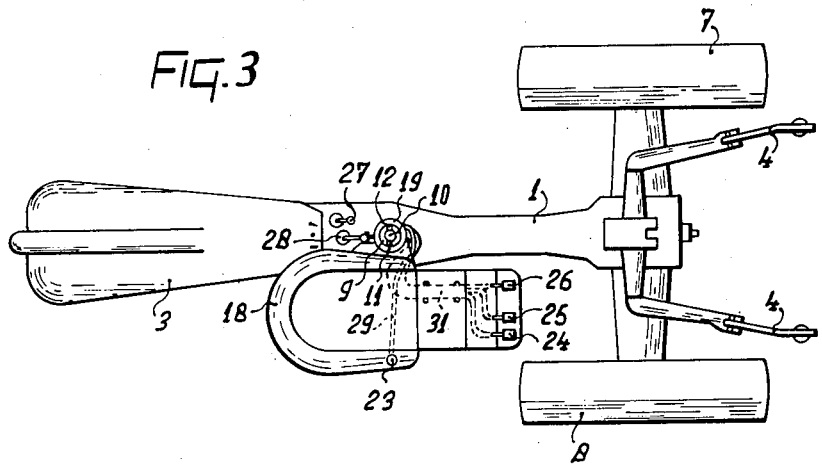
Figure 4:
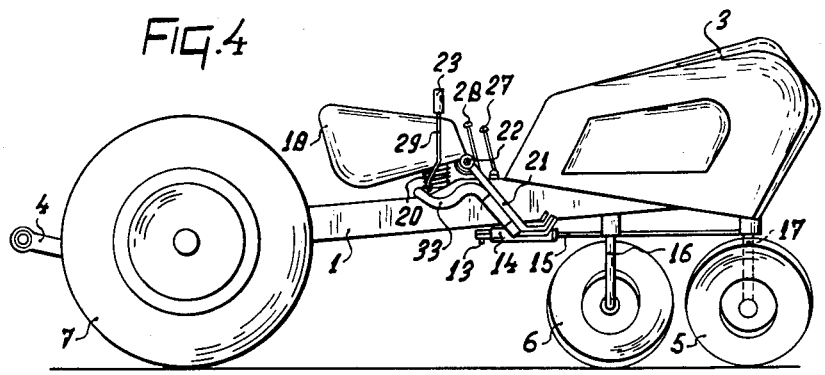

For a better understanding of the invention, reference will now be made to the accompanying drawings, in which:

FIGURE 1 is a plan view of a tractor according to the invention,

FIGURE 1A is a sectional view through a portion of a steering column employed in the apparatus of FIG. 1, FIGURE 1B is a top view of the steering column of FIG. 1A, FIGURE 2 is a side elevation of the tractor shown in FIG. 1, as seen in the direction of the arrow II in FIG. 1, FIGURE 3 is a plan view of the tractor shown in FIG. 1 in which, however, the seat has been swung to another position, FIGURE 4 is a side elevation of the tractor shown in FIG. 1, as seen in the direction of the arrow IV in FIG. 1, FIGURE 5 is a front elevational view of the steering wheels of the tractor with a modified steering mechanism partly in cross section, FIGURE 6 is a plan view of the section of the tractor shown in FIGURE 5, partly in cross section.

Referring to the embodiment shown in FIGS. 1 to 4, the tractor comprises a frame 1 which has at one end 2 an engine (not shown) arranged beneath a bonnet 3, and at the other end a lifting device 4. The tractor is advantageously adapted to be driven in opposite directions. The frame 1 is supported at the end 2 on two steerable ground wheels 5 and 6, arranged one behind the other upon shafts 16 and 17, and at the other end on two engine-driven ground wheels 7 and 8.

For steering the ground wheels 5 and 6, the frame 1 has a steering column 9 provided at the top with a steering device including a steering member consisting of a lever 10, which can be swung to the left or to the right for steering the wheels 5 and 6, the top of the steering column 9 having elongated holes 11 and 12 to permit the swinging movement of the lever.

The upper end of the lever 10 carries a handgrip with the aid of which the lever can be manually controlled by the driver. By moving the lever 10 a mechanism 14, which is pivotable about a vertical shaft 13 and which carries a steering rod 15, is actuated. The steering rod 15 is pivotally connected to an arm which is rigidly attached to the vertical shaft 16. A link connects the rod 15 also to an arm which is rigidly attached to the shaft 17. The steering device is such that, for turning to the left, when driving in the direction of the arrow I, the lever 10 is swung to the left, while for turning to the right, the lever 10 is swung to the right.

When the lever 10 is swung to the left, the mechanism 14 is such as to draw the steering rod 15 towards the shaft 13, so that the wheels 5 and 6 will turn in counter-clockwise direction (as seen from above) about their vertical shafts 17 and 16. When the lever 10 is swung to the right, the steering rod 15 will be pushed by the mechanism 14 away from the shaft 13 so that the wheels 5 and 6 will turn about their shafts 17 and 16 in a clockwise direction as viewed from above. Thus the movement of the lever produces a corresponding steering movement of the tractor to the same side. The lever 10 can be easily actuated by the driver of the tractor from a seat 18 which is supported upon the steering column 9 by means of a bearing 19. The latter is located at the front end of the seat at one corner thereof.

The seat 18, which can be turned through an agle of at least 90° about the steering column 9, is capable of yielding resiliently with respect to the steering column 9 in a vertical direction since the bearing 19 is resiliently supported by a compression spring 20 located between the bearing 19 and the frame 1.

In order to turn the seat 18, which is provided with a foot rest 21, through 180° about the steering column 9, the foot rest 21 is connected with the aid of a horizontal hinge 22 with the seat 18 so that, when the seat 18 is turned, the foot rest 21 which is normally located at a lower level than the frame 1 can be displaced upwardly and then downwardly about the hinge 22, whereby the foot rest when the seat 18 is turned can be passed over the frame 1. Movement of foot rest 21 about hinge 22 is limited by a cam 21A. Locking pin or means 18A is preferably provided for locking the seat in any one of its various positions of adjustment about the column 9.

For controlling the tractor, the arm rest of the seat 18 carries a device 23 with which the fuel supply for the engine can be controlled, while the foot rest 21 carries two pedals 24 and 25 for controlling the brakes on the wheels 7 and 8 and also a pedal 26 for coupling and decoupling the engine with or from the wheels 7 and 8. Further, frame 1 is provided with control levers 27 and 28 which can be readily actuated from the seat 18 and which control the transmission between the engine and the wheels 7 and 8. Since the seat 18 and the foot rest 21 are turnable about the steering column 9, the control members 23, 24, 25 and 26 are connected by flexible connections with the corresponding control mechanisms located on the frame 1. In this embodiment, for example, the device 23 is connected by means of a Bowden cable 29 with the related mechanism on the frame 1, while the pedals 24, 25 and 26 are connected with the related mechanisms on the frame 1 by means of hydraulic ducts 30, 31 and 32, enclosed in a common sleeve 33.

It is particularly useful that the seat 8 can be turned about the steering column 9, when the tractor is to be driven in an opposite direction to the arrow I over a great distance, or when the tractor is towing an agricultural machine which requires continuous supervision during working. In order to drive a great distance in this opposite direction, the seat can be arranged in the position shown in FIG. 3, so that the sdriver can easily look in the direction of travel. The arrangement whereby the lever 10 is swung to the left or to the right for steering has a further advantage in that, when travelling in reverse, the lever 10 is still moved to the left of the visual line in the direction of travel to turn left and to the right for a right-hand turn, "left" and "right" being, of course, with reference to the longitudinal axis of the tractor.

Further it is of advantage that under all circumstances the lever is to be controlled with the driver's same hand no matter whether the driver sits in a seat in a first or in another position.

When the tractor has an agricultural machine attached upon the lifting device 4 and travels in the direction of the arrow I, it may be advantageous to arrange the seat 18 in the position shown in broken lines in FIG. 1. In this position of the seat the driver can easily look both in the direction of travel I and in the direction of the implement attached to the lifting device 4.

Although in the described constructions the seat 18 is rotaable about the steering column 9, it will be obvious that, as an alternative, a separate vertical column may be provided for the seat 18. In this case, however, care has to be taken that the additional vertical column should be located so near the steering column 9 that the members 27 and 28 can be actuated easily from the seat.

In the FIGURES 5 and 6 a steering mechanism is shown that differs from the steering mechanism of the FIGS. 1–4 only in that the horizontal axle about which the lever 10 can turn lies near the top side of the column 9' so that no elongated holes 11 and 12 are needed. According to FIGURES 5 and 6 the lever 10 can rotate about an axle 34 which is mounted on the upper side of the column 9'. The lever 10 is connected with the rod 35 of a feed regulator 36 by means of a yoke 37. By controlling the regulator 36 with the aid of the lever 10 which moves yoke 37, oil can be passed through the pipe 38 or 39. On a passing of the oil through the pipe 38, the rod 15 will move away from the axle 13, whereas on a passing of the oil through the pipe 39 the rod will move towards the axle 13. This controls movement of wheels 5 and 6.

The feed regulator 36 is provided with an inlet pipe 40 which can, for instance, be coupled to an oil accumulator or the motor of the tractor.

What we claim is:

1. An agricultural tractor comprising an agricultural tractor chassis having a longitudinal axis, a seat displaceable on said chassis whereby an operator may assume different operational positions, locking means operatively associated with said seat to lock the same in at least forwardly and rearwardly facing directions, a steerable wheel on said chassis for the guidance of the latter, a lever on said chassis displaceable in opposite directions transverse to said axis, and coupling means coupling said lever to said wheel such that a movement of said lever toward one side of said axis causes a movement of said wheel resulting in a guiding of said chassis in a direction corresponding to the movement of said lever whereby said operator can control movements of said vehicle with motions independent of the relation of said seat to said chassis.

2. An agricultural tractor as claimed in claim 1 comprising resilient bearing means supporting said seat and defining a vertical axis of rotation therefor.

3. An agricultural tractor as claimed in claim 2 wherein the seat is positioned to one side and to the rear of said vertical axis.

4. An agricultural tractor as claimed in claim 2 wherein the seat is rotatable through an angle of about ninety degrees.

5. An agricultural tractor as claimed in claim 2 comprising arm rests on said seat, said lever including a handgrip located adjacent said arm rests.

6. An agricultural tractor as claimed in claim 5 wherein said seat is rotatable so that said hand-grip is located adjacent one of said arm rests irrespective of the position of said seat.

7. An agricultural tractor as claimed in claim 5 wherein said vehicle comprises an engine, a fuel supply coupled to said engine and a control device coupled to said fuel supply for controlling the latter, said control device being positioned on the other of said arm rests.

8. An agricultural tractor as claimed in claim 2 wherein said resilient bearing means comprises a steering column at the upper end of which is positioned said lever.

9. An agricultural tractor as claimed in claim 8 wherein said steering column is located at one side of said seat.

10. An agricultural tractor as claimed in claim 2 wherein said lever is pivotal about an axis parallel to the longitudinal axis of said chassis.

11. An agricultural tractor as claimed in claim 2 comprising a foot rest on said seat and including a pedal control means for controlling said vehicle.

12. An agricultural tractor as claimed in claim 11 comprising flexible hydraulic ducts connecting said pedal control means to said chassis.

13. An agricultural tractor comprising an agricultural tractor chassis having a longitudinal axis, a seat displaceable on said chassis whereby an operator may assume different operational positions, locking means operatively associated with said seat to lock the same in at least forwardly and rearwardly facing directions, a steerable wheel on said chassis for the guidance of the latter, a lever on said chassis displaceable in opposite directions transverse to said axis, coupling means coupling said lever to said wheel such that a movement of said lever toward one side of said axis causes a movement of said wheel resulting in a guiding of said chassis in a direction corresponding to the movement of said lever whereby said operator can control movements of said vehicle with motions independent of the relation of said seat to said chassis, resilient bearing means supporting said seat and defining a vertical axis of rotation therefor, a foot rest on said seat and including a pedal control means for controlling said vehicle, and flexible hydraulic ducts connecting said pedal control means to said chassis, said foot rest being pivotable about a substantially horizontal axis.

References Cited in the file of this patent

UNITED STATES PATENTS

| | | |
|---|---|---|
| 1,748,041 | Backhus | Feb. 18, 1930 |
| 2,422,813 | Walch | June 24, 1947 |
| 2,586,273 | Steven | Feb. 19, 1952 |
| 2,601,886 | Randolph | July 1, 1952 |
| 2,796,140 | Knolle | June 18, 1957 |
| 2,833,367 | Pool et al. | May 6, 1958 |
| 2,845,990 | Hubert | Aug. 5, 1958 |
| 2,863,518 | Pellizzetti | Dec. 9, 1958 |

FOREIGN PATENTS

| | | |
|---|---|---|
| 725,871 | France | Feb. 22, 1932 |
| 964,907 | Germany | May 29, 1957 |
| 1,153,901 | France | Oct. 21, 1957 |